(12) United States Patent
Jürimäe et al.

(10) Patent No.: US 12,132,441 B2
(45) Date of Patent: Oct. 29, 2024

(54) SYSTEM AND METHOD FOR CONNECTING AND FIXING FRAMED SOLAR PANELS TO MAKE A WHEATHERPROOF BUILDING-INTEGRATED MODULAR SURFACE

(71) Applicant: SOLARSTONE OÜ, Viljandi (EE)

(72) Inventors: Mattis Jürimäe, Tartu maakond (EE); Mati Kraavi, Viljandi maakond (EE); Silver Aednik, Tartu (EE)

(73) Assignee: SOLARSTONE OÜ, Viljandi (EE)

( * ) Notice: Subject to any disclaimer, the term of this patent is extended or adjusted under 35 U.S.C. 154(b) by 60 days.

(21) Appl. No.: 17/925,178

(22) PCT Filed: May 14, 2021

(86) PCT No.: PCT/IB2021/054159
§ 371 (c)(1),
(2) Date: Nov. 14, 2022

(87) PCT Pub. No.: WO2021/229532
PCT Pub. Date: Nov. 18, 2021

(65) Prior Publication Data
US 2023/0188087 A1    Jun. 15, 2023

(30) Foreign Application Priority Data
May 15, 2020   (EE) ................. P202000007

(51) Int. Cl.
H02S 30/10         (2014.01)
H02S 20/25         (2014.01)

(52) U.S. Cl.
CPC ............. H02S 30/10 (2014.12); H02S 20/25 (2014.12)

(58) Field of Classification Search
CPC .......... H02S 30/10; H02S 20/25; H02S 30/00; Y02B 10/10; Y02E 10/47; Y02E 10/50
(Continued)

(56) References Cited

U.S. PATENT DOCUMENTS 10,749,459 B1 *   8/2020   Liu ................. F16B 5/0685
10,951,157 B1 *   3/2021   Young ................ H02S 30/10
(Continued)

FOREIGN PATENT DOCUMENTS

EP    1703037 A1    9/2006
EP    1777357 A1    4/2007
(Continued)

OTHER PUBLICATIONS

International Search Report and Written Opinion in Application No. PCT/IB2021/054159, mailed August, 5, 2021, 12 pages.
(Continued)

Primary Examiner — Muhammad Ljaz
(74) Attorney, Agent, or Firm — Koivula & Somersalo, LLC

(57) ABSTRACT

System and method for connecting and fixing framed solar panels to make a weatherproof building-integrated modular surface for the substrate batten. The system comprises connecting means comprising a top strip manufactured on the basis of the U-profile, a left-side strip, and a right-side strip, whereas the side strip is configured to engage the adjacent side strip configuration and mounting brackets of various shapes. Optional extended top strip and side strip extension strips are also provided, with which the modular surface made of framed solar panels can be extended in both height and width, if necessary.

8 Claims, 6 Drawing Sheets

(58) Field of Classification Search
USPC .......................................................... 248/200
See application file for complete search history.

(56) References Cited

U.S. PATENT DOCUMENTS

| | | | | |
|---|---|---|---|---|
| 11,821,574 B1* | 11/2023 | Young | ...................... | F24S 25/65 |
| 2011/0314752 A1* | 12/2011 | Meier | ...................... | F24S 25/20 |
| | | | | 52/173.3 |
| 2016/0126884 A1* | 5/2016 | Stearns | ................. | F24S 25/632 |
| | | | | 52/173.3 |
| 2017/0170579 A1* | 6/2017 | Martin | ................... | F24S 25/636 |
| 2019/0178274 A1* | 6/2019 | Katz | ......................... | H02S 20/20 |
| 2019/0238086 A1* | 8/2019 | Saito | ................... | H01L 31/0543 |
| 2019/0372507 A1* | 12/2019 | Kobayashi | ............ | F16B 5/0628 |
| 2020/0266754 A1* | 8/2020 | Ferris | .................... | F24S 25/634 |
| 2021/0194410 A1* | 6/2021 | Yang | ........................ | H02S 20/23 |
| 2021/0242825 A1* | 8/2021 | Matthess | ................. | H02S 20/00 |
| 2021/0320620 A1* | 10/2021 | Jacobs | .................... | H02S 30/00 |

FOREIGN PATENT DOCUMENTS

| | | | |
|---|---|---|---|
| EP | 1060520 B1 | 4/2008 | |
| FR | 2963801 A1 | 2/2012 | |

OTHER PUBLICATIONS

Tesla Solar Roof. Accessed on Nov. 10, 2022, https://tesla.com/solarroof.

* cited by examiner

SYSTEM AND METHOD FOR CONNECTING AND FIXING FRAMED SOLAR PANELS TO MAKE A WHEATHERPROOF BUILDING-INTEGRATED MODULAR SURFACE

TECHNICAL FIELD

The present invention relates to the field of energy and building materials, and more particularly to a strip-clamp solution for connecting and fixing a pre-framed solar panel as a click-on connection and a method for producing a weatherproof modular surface that can be integrated and adapted to the dimensions of the substrate.

PRIOR ART

The increasing use of renewable energy sources has led to the widespread use of solar panels and their installation on roofs, façades, and walls of buildings. To facilitate the use of solar panels, standard-sized framed solar panels have been introduced to the market, which can be installed on top of existing roof, façade, and wall coverings. 90% of the standard size and framed solar panels available on the market for immediate installation are made up of 35×35 cm frames, but there are also slightly different standard sizes of framed solar panels (see also here: global.talesun.com/upload/2018/06/08/15284452439938x4jo5.pdf. There are also special solutions where the entire roof surface is made of custom-made solar panels (e.g., www.tesla.com/solarroof). However, there are no effective technical solutions for integrating (installation) of such ready-to-use and framed standard size solar panels into or instead of an existing roof, façade, and wall covering (covering a new roof, façade, and external wall). Such integrated solutions also have shortcomings in terms of their water-resistance.

Prior art EP 1 060 520 B1 (published 23 Apr. 2008) discloses a frame made of three differently shaped profiles which are fastened around a solar panel glass to form a framed solar panel that can be mounted on the roof by means of a frame. The introduction and installation of this can be product seen below: www.ernstschweizer.ch/fileadmin/user_upload/00_Produkte/80_Sonnenenergie-Systeme/pdf/Photovoltaik-Montagesystem_Indach_Solrif.pdf. Solution FR 2963801 A1 (Solframe) is also known. The disadvantage of these solutions is that it is a semi-finished product, i.e., a separate solar panel glass, to which a separate frame (profiles) is added, as a result of which a finished solar panel with separate profiles according to the invention is suitable for installation on the roof. The disadvantage of these solutions is that it is not possible to use these profiles to install standard size and so-called instantaneous solar panels already framed in the manufacture of solar panels on a substrate, which would also form a weatherproof building-integrated modular surface. Also, these solutions do not provide for the possibility of varying the surface area of the modular surface formed from the solar panels depending on the surface area.

SUMMARY OF THE INVENTION

The object of the present invention is to provide a universal technical system in the form of a click-on connection of pre-framed solar panel of standard size and available for immediate use (installation), for installation on substrate batten (roof, wall, façade) using connecting means and mounting brackets and a method for producing a weatherproof, modular surface that can be integrated and adapted to the dimensions of the substrate from such standard-sized framed solar panels.

The framed solar panel is installed on the gutter of the intended substrate batten by means of three different profile strips and two differently shaped mounting brackets.

Depending on the dimensions of the substrate, it is also possible to use extended strips and extension strips, by means of which the modular surface can be extended to both height and width, if necessary, to increase the effective coverage of the modular surface formed of standard size solar panels depending on the dimensions of the substrate.

The strips of the invention are three strips made of U-profile—an upper strip, a left-side strip, and a right-side strip, each having different strip-specific features and two clamps of different shapes and different clamp-specific features—a first-row mounting bracket, and a continuation row mounting bracket. In addition, in situations where standard-sized framed solar panels do not provide complete coverage of the substrate, the upper skirting with extended intermediate branch and/or branches and the extension strip with side skirting are used optionally, by which the modular surface formed of standard-sized framed solar panels can be extended, if necessary, in both height and width, in order to increase the effective coverage of the modular surface of the solar panels, depending on the dimensions of the substrate.

The strips and clamps of the invention are pre-tensioned with connecting parts, which allows their click-on installation.

The strips are connected to the standard size and previously framed solar panel frame as a click-on connection, which allows the strips to be connected to the solar panel frame without the use of additional fastening means and, if necessary, removed without the use of aids. The clamps are attached to the substrate, and framed solar panels, in turn, are attached to and supported by the clamps. When using the different profile strips and fastening clamps according to the invention is formed for substrate batten a weather-resistant modular surface (e.g., roof, façade, wall) of standard dimensions connected to the strips and made of pre-framed solar panels that can be integrated into the building and adapted to the dimensions of the substrate.

DETAILED DESCRIPTION OF THE INVENTION

Figure 1:
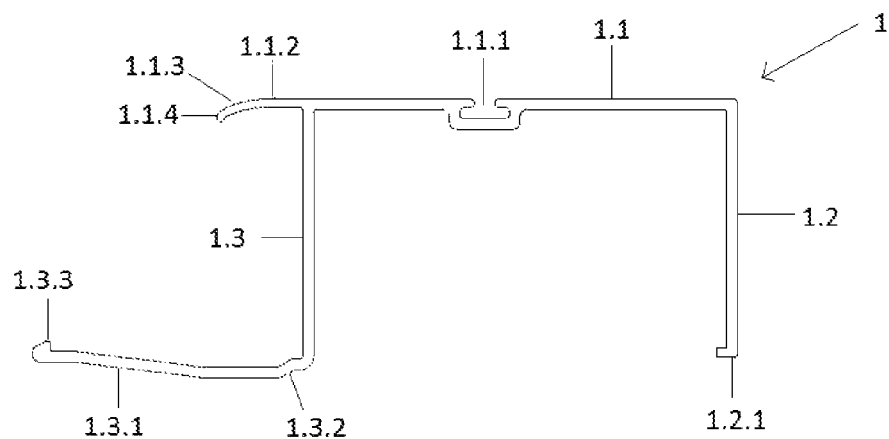
FIG. 1 shows the upper strip.

The invention provides connection and fastening means and their use for the quick and convenient installation of commercially available ready-made form standard size framed solar panels on the roof, façade, and wall, preferably to integrate a framed solar panel connected by strips instead of an existing substrate and to make these solar panels a complete weatherproof building-integrated and surface-adaptable modular surface (roof, façade, wall exterior).

The invention provides three U-profile strips, each with different strip-specific characteristics, and two clamps of specific shapes, and with different clamp-specific characteristics. In addition, the invention provides extended strips and extension strips for solving intermediate dimensions of the substrate.

The strips and clamps are made of rigid stainless steel with small shape memory. The dimensions of the profile and the clamps of the strips may differ according to the dimensions of the framed solar panel and the characteristics of the substrate. The number of clamps used depends on the angle of inclination of the substrate (e.g., the flatter the roof, the fewer clamps need to be used).

Part of the profile for fastening the strips to the framed solar panel is prestressed, which means that the parts made of rigid metal have small shape memory, i.e., they retain a significant original shape when pressurized. The prestressing is ensured by a slight inward bending or shaping or breaking of the respective profiles so that they form a visually lightly arcuate shape, which allows the profile to be pressurized and attached around the solar panel frame. The ends of the respective profiles are also either screwed in or contain fastening pins, which allows the profiles to be fastened around the frame of the solar panel as a click-on connection.

The profile attached around the solar panel frame and the strip of the clamps are also prestressed, which means that it is partially bent inwards or shaped or broken, which allows the profile to be pressurized around the solar panel frame. The ends of the respective profiles are also bent away, which allows the frame and strip of the solar panel to be conveniently inserted into the bracket and, if necessary, removed therefrom. In addition, the part for attaching the clamp to the substrate is also prestressed.

The strips are connected to the framed solar panel as a click-on connection. The solar panel surrounded by the strips is also attached to the clamps as a click-on connection.

The end corners of the strip profiles are cut at an angle so that there is no gap between the strips when connecting the framed solar panel. This is important to match them and create a weatherproof connection around the framed solar panel.

In addition, the invention provides two elongated upper strips of different lengths for solving (extending) the intermediate dimensions of the base surface to a height, The end corners of which are also cut at an angle so that, even when connecting the extension strips around the framed solar panel, there is no difference between the upper strip and the side strips. These extended top strips also attach to the framed solar panel as a click-on connection.

In addition, an extension strip is provided for solving (extending) the width of the modular surface, which acts as a separate strip and which is not connected to the framed solar panel but is connected to the side strip(s). The side strip extension strip can be used both between framed solar panels and on their separate sides (e.g., to complete the end panel). The extension strip of the side strip can be cut shorter if necessary.

A preferred embodiment relates to the installation of commercially available standard size and pre-framed solar panels on a pitched roof to form a modular surface (roof surface) that can be adapted to the dimensions of the substrate.

The connecting means of the framed solar panel 8 of the preferred embodiment of the invention comprise an upper strip 1 and a water seal 7 to be installed therein, a left-side strip 2, a right-side strip 3, and fastening means comprising a first-row mounting bracket 5 and a continuation row mounting bracket 6 of the solar panel 8. Strips 1, 2, 3 are made on the basis of a U-profile, and each has different strip-specific features.

The upper strip 1 (FIG. 1) comprises straight branches at right angles in relation to the bottom 1.1 and the bottom 1.1—the right branch 1.2 and the left branch 1.3, which form a U-gap. In the middle of the bottom 1.1 there is a sealing groove 1.1.1 for installing an elastomeric water seal 7, the part of which protruding from the sealing groove 1.1.1 has a special shape 7.1, which directs the waters accompanying the strong wind 1 away from the upper strip 1. The base 1.1 has an extension 1.1.2 projecting to the left and prestressed towards the inside of the upper strip 1, the slightly curved end part 1.1.3 of which comprises a coupling nozzle 1.1.4. The left branch 1.3 comprises an extension 1.3.1, which is slightly arcuately prestressed towards the inside of the upper strip one and turned from branch 1.3 substantially at right angles (however less than 90°) to the left. Extension 1.3.1 contains a slightly wavy connecting part 1.3.2 at the junction of branch 1.3 and extension 1.3.1 and a fastening tip 1.3.3 at the end of extension 1.3.1.

Figure 1A:
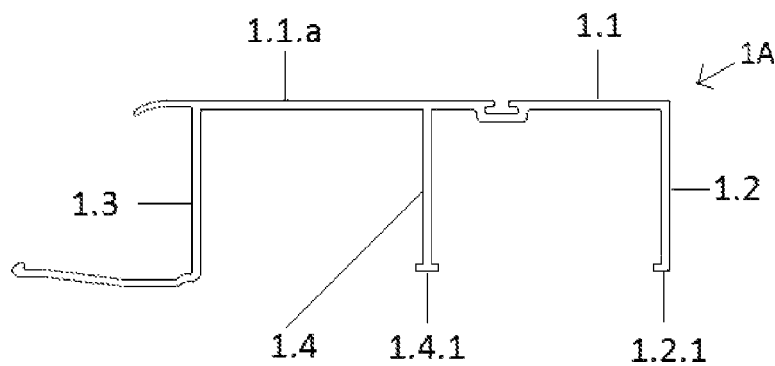
FIGS. 1A and 1B show an extended upper strip with an intermediate branch(es).

In another embodiment, instead of the upper strip 1, an upper elongated strip 1A (FIG. 1A) with an intermediate branch made on the basis of a U-profile can be used to extend the strip to the height of the overlap, the base 1.1 having a bottom part 1.1. of the extension. The upper strip 1A with an extended intermediate branch comprises a straight intermediate branch 1.4 at the transition point of the base 1.1 and the extended bottom part 1.1.a, extending at right angles into the U gap, which includes a sole plate 1.4.1 in its external part.

Figure 1B:
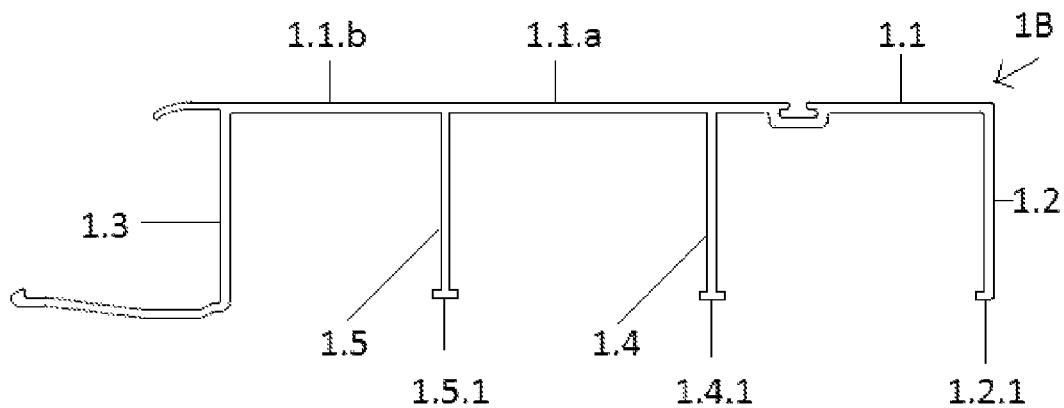

In yet another embodiment, instead of the upper strip 1 or the upper extended strip 1A with an intermediate branch, in order to extend the overlap even more to the height, the extended upper strip 1B (FIG. 1B) with intermediate branches, made on the basis of U profile, with the base 1.1 of which has a double extended base 1.1.a., and it also has a base 1.1.b with an additional extension. The upper strip 1B with extended intermediate branches comprises a straight intermediate branch 1.4 at the transition point of the base 1.1 and the extended base part 1.1.a at a right angle thereto and a straight intermediate branch 1.5 at the transition point of the extended base parts 1.1.a and 1.1.b at a right angle thereto, projecting into the U-gap. The right branch 1.2, the intermediate branch 1.4, and the intermediate branch 1.5 contain sole plates 1.2.1, 1.4.1, and 1.5.1 in their outer part.

Figure 2:
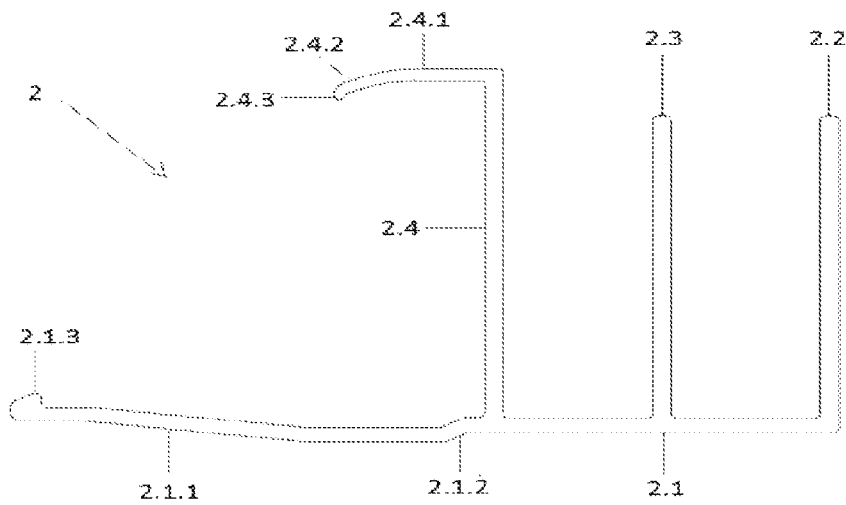
FIG. 2 shows the left-side strip.

The left-side strip 2 (FIG. 2) comprises a base 2.1 and straight branches 2.2, 2.3, and 2.4 projecting at right angles to the base, which forms two U-shaped branches open upwards, which perform the function of a water trap. The upper part of the branch 2.4 is an extension 2.4.1 projecting to the left at a right angle and prestressed towards the inside of strip 2, the slightly curved end part 2.4.2 of which comprises a coupling tip 2.4.3. Base 2.1 comprises extension 2.1.1 projecting to the left and a slightly arcuately prestressed towards the inside of strip 2, which contains a slightly wavy connecting part 2.1.2 at the transition point between the base 2.1 and the extension 2.1.1 and a fastening tip 2.1.3 at the end part.

Figure 3:
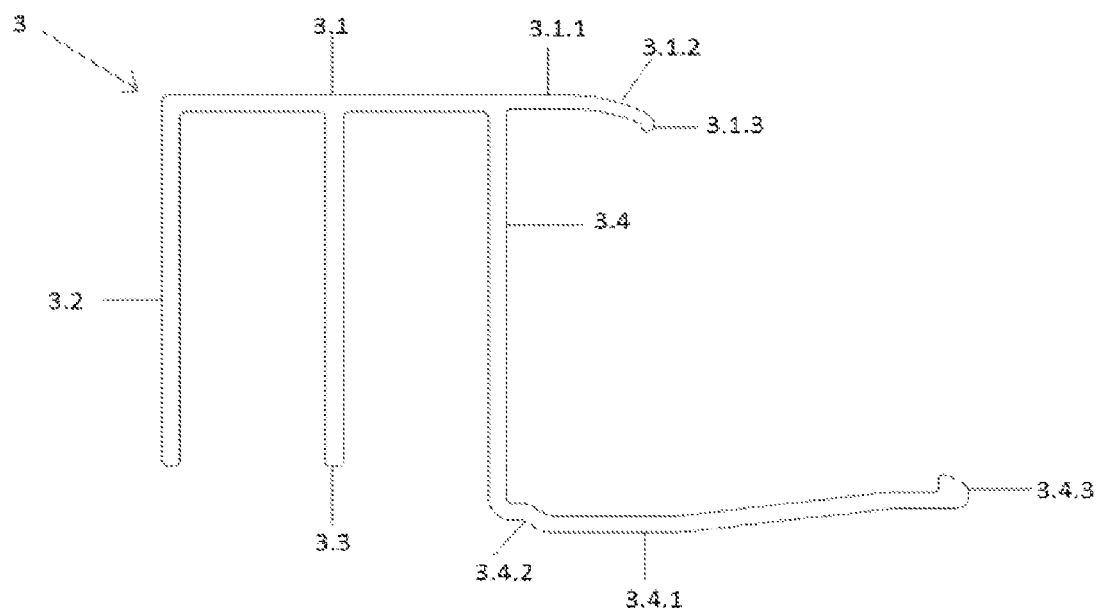
FIG. 3 shows the right-side strip.

The right-side strip 3 (FIG. 3) comprises base 3.1 and straight branches 3.2, 3.3, and 3.4 projecting at right angles to the base, which forms two U-shaped branches open downwards, which perform the function of a water trap. Base 3.1 comprises an extension 3.1.1 projecting to the right and slightly arcuately biased towards the inside of the right-side strip 3, the slightly arcuate end portion 3.1.2 of which comprises a coupling tip 3.1.3. Branch 3.4 comprises an extension 3.4.1, which is prestressed towards the inside of the right-hand side strip 3, and branch 3.4 is rotated substantially at right angles (however less than 90°) slightly arcuately to the right. Extension 3.4.1 contains a slightly wavy connecting part 3.4.2 at the junction of branch 3.4 and the extension 3.4.1 and a fastening tip 3.4.3 at the end of extension 3.4.1.

Figure 8:
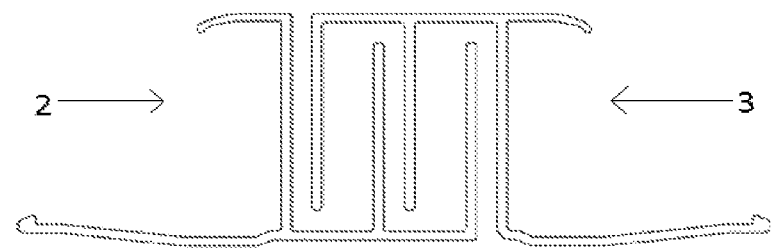
FIG. 8 shows a water trap formed by the left-side strip of FIG. 2 and the right-side strip of FIG. 3.
Figure 9:
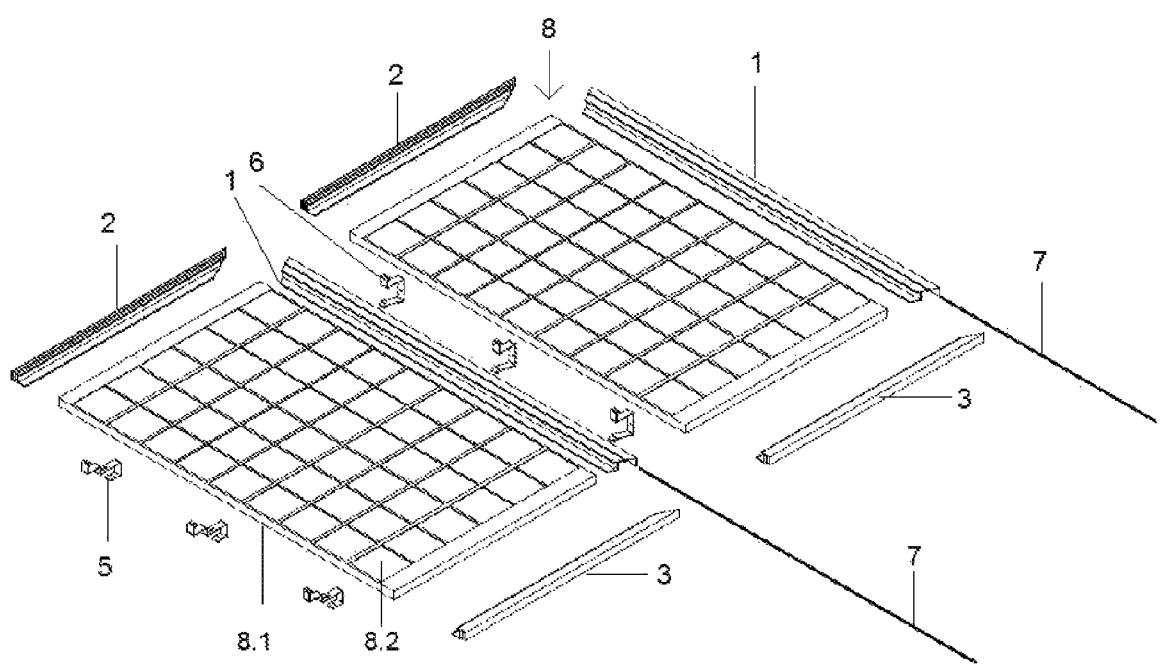
FIG. 9 is a general assembly drawing of a technical solution of the invention, showing a standard framed solar panel and strips, mounting brackets, and a water seal added thereto.
Figure 10A:
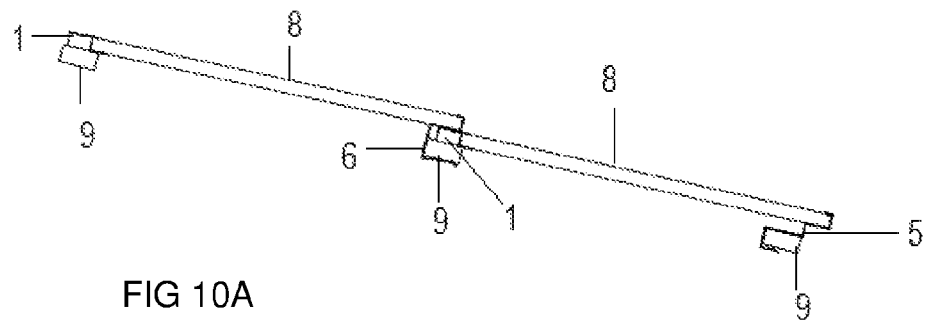
FIGS. 10A, 10B, and 10C show alternative general views (side views) of the technical solution of the invention, showing the fastening of the framed solar panel to the ground with the mounting brackets of the invention (the figures show the use of an upper extension strip of different lengths).
Figure 10B:
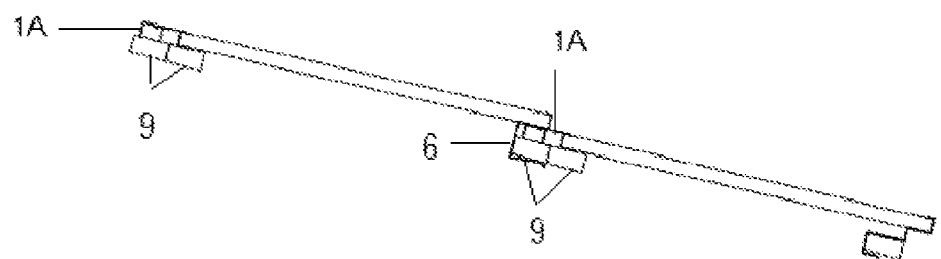
Figure 10C:
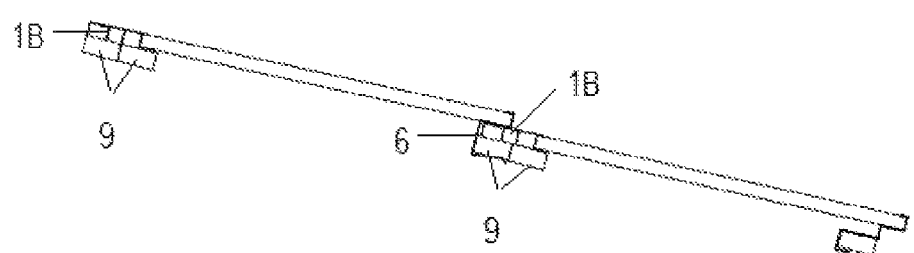

When installed on a substrate, the left-side strip 2 and the right-side strip 3 of framed solar panels next to each other form a two-channel water trap when fitting the U-shaped branches into each other (FIG. 8).

Figure 4:
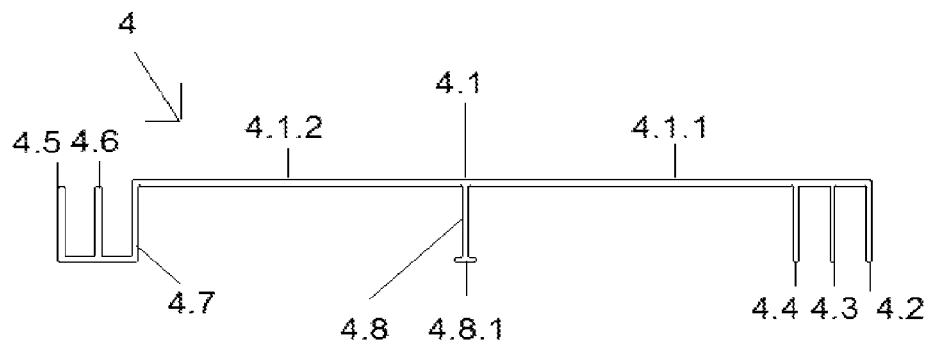
FIG. 4 shows an extension strip of the side strip(s).

In another embodiment, the side strip extension strip 4 can be used to extend the left-side strip 2 and the right-side strip 3 to the width of the overlap (FIG. 4). The side strip extension strip 4 (FIG. 4) comprises a straight base 4.1, which is conditionally divided in the middle into two bottom parts 4.1.1 and 4.1.2, at the transition point of which there is a straight intermediate branch 4.8 at right angles, which contains a sole plate 4.8.1 in its outer part. The side strip extension strip 4 comprises straight branches 4.2, 4.3, and 4.4 projecting at right angles from its right base part 4.1.1, which form two U-shaped branches open downwards, which perform the function of a water trap. The side strip extension strip 4 comprises straight branches 4.5, 4.6, and 4.7 projecting at right angles from its right base part 4.1.2, which form two U-shaped branches open upwards, which perform the function of a water trap.

The side strip extension strip 4 can be used as a separate strip and is not connected to the framed solar panel 8, but its U-shaped branches are connected to left-side strip 2 and to the right-side strip 3 by correspondingly coupling U-shaped branches. The side strip extension strip 4 can be used both between the side parts of the framed solar panels 8 and on their separate sides (e.g., to start/end the extreme framed solar panel 8). The side strip extension strip 4 can be cut shorter, if necessary, by removing one U-shaped branch (e.g., for use on the end panels).

Figure 5:
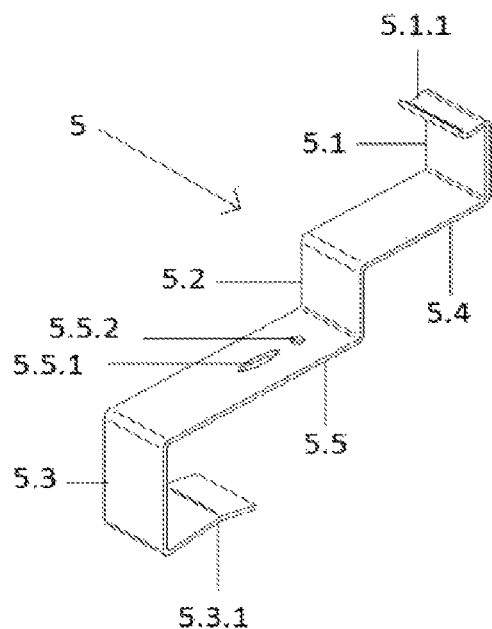
FIG. 5 shows a first-row mounting bracket.

The fastening bracket 5 of the first row of the framed solar panel 8 (FIG. 5) comprises a stepped main part comprising straight vertical parts, which are the upper vertical part 5.1, the middle vertical part 5.2, and the lower vertical part 5.3 and straight horizontal parts which are the upper horizontal part 5.4 and the lower horizontal part 5.5, the vertical and horizontal parts being arranged at right angles to each other. In the upper vertical part 5.1, has a special-shaped (wavy) inward prestressed extension 5.1.1 that is turned at substantially right angles to the upper left (but less than 90°)°, which is bent upwards at an obtuse angle approximately from the middle, which facilitates the insertion and removal of the framed solar panel 8 from the mounting bracket 5 of the upper row. In the lower vertical part 5.3, has a special-shaped (wavy) inward prestressed extension 5.3.1 that is turned at right angles to the lower right (but less than 90°), which is bent downwards at an obtuse angle from the middle, which facilitates the insertion and removal of the fastening bracket 5 of the first row from the roof batten 9. The lower horizontal part 5.5 has openings 5.5.1, 5.5.2 for the addition of optional fastening elements, the opening 5.5.1 having the possibility of positioning the fastening of the first-row fastening bracket 5.

The fastening bracket 5 of the first row is fastened around the roof batten 9 with the lower vertical part 5.3 and its prestressed extension 5.3.1 and is optionally fastened to the batten 9 through the openings 5.5.1, 5.5.2 in the horizontal part 5.5 by additional fastening means. When mounting the framed solar panel 8 on the substrate, it is pushed against the upper vertical part 5.1 of the first-row mounting bracket 5 with the lower frame 8.1 of the solar panel and fixed with prestressed extension 5.1.1, and the framed solar panel 8 rests on the upper horizontal part 5.4 of the first-row mounting bracket 5. The lower horizontal part 5.5 remains as a wind intake duct. For each framed solar panel 8, at least three first-row mounting brackets 5 are provided (the number of brackets depends on the slope of the roof, the higher the slope of the roof, the greater the number of brackets required). The location of the outer first row brackets 5 is in the immediate vicinity of the ends of the solar panel (e.g., approx. 20 cm away from the end of the solar panel). The middle bracket(s) is placed approximately centrally on the solar panel 8 framed between the outermost brackets. The vertical distance of the first row of fastening clamps 5 on the batten 9 depends on the solution of the eaves and the drainage of the specific object.

The mounting bracket 5 of the first row is made of stainless steel with small shape memory. This feature is particularly important at the prestressed extensions 5.1.1 and 5.3.1, which allows at the insertion of the solar panel 8 framed in it to retain their original shape, so they fit tightly around the frame of the solar panel.

Figures 6A, 6B:
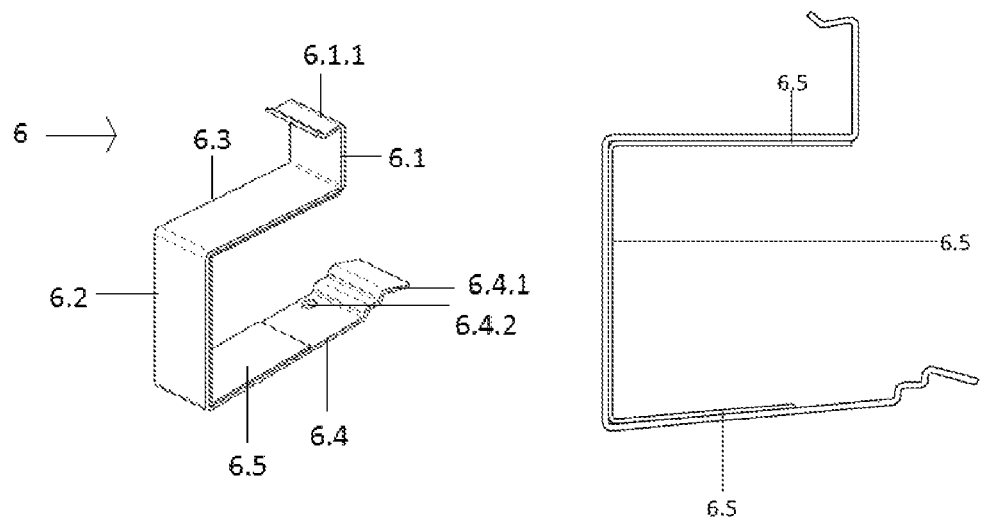
FIGS. 6A and 6B show a continuation row mounting bracket.

The extension row mounting bracket 6 of the framed solar panel 8 (FIGS. 6A and 6B) is U-shaped, comprising an upper horizontal part 6.3 and a lower horizontal part 6.4 and a lower vertical part 6.2 connecting them, forming a U-gap (U-box). In addition, the upper horizontal part 6.3 has upper vertical part 6.1 projecting up partially at the right angles. The upper vertical part 6.1 has a prestressed extension 6.1.1 inverted towards the mounting bracket 6 of the special shape (corrugated) extending substantially at right angles to the upper left (but less than 90°) and bent at an obtuse angle approximately in the middle, which facilitates the insertion of the framed solar panel, and removal from the extension row connection bracket 6. The connection between the upper horizontal part 6.3 and the lower vertical part 6.2 is the right angle. The lower horizontal part 6.4 is turned substantially at the right angle (but less than 90°) right in a prestressed way from the connection point of the lower vertical part 6.2. The lower horizontal part 6.4 has a stepped extension 6.4.1 prestressed towards the inside of the extension row mounting bracket 6, the end of which is bent outwards, which facilitates the attachment of the extension row mounting bracket 6 to the roof batten 9 and, if necessary, its removal therefrom. The lower horizontal part 6.4 has an opening 6.4.2 for adding an optional fastening element. The upper horizontal part 6.3, the lower horizontal part 6.4, and the lower vertical part 6.2 are connected to a reinforcing part 6.5 (double bottom and wall) following their shape.

The fastening bracket 6 of the extension row secures two framed solar panels 8 mounted vertically, one on top of the other and connected to the strips. The vertically lower framed solar panel 8 rests on the roof batten 9 with the upper part—the U-box of the upper strip 1 rests on the roof batten 9. The extension row mounting bracket 6 is then placed vertically on the upper strip 1 of the lower framed solar panel 8 with a U-gap so that the inside of the upper horizontal plane 6.3 of the bracket rests against it. The continuing row clamp 6 is in turn fastened around the roof batten 9 via the lower horizontal part 6.4 and its stepped prestressed extension 6.4.1 and the lower vertical part 6.2 (U-gap or U-box) and optionally adding additional fastening means through the opening 6.4.2. Thus, groove 9 and the upper part of the vertically lower framed solar panel 8 are fixed in the U-gap of the continuing row mounting bracket 6 by means of a prestressed horizontal part 6.4. The vertically upper framed solar panel 8 is pushed against the upper vertical part 6.1 of the extension bracket 6 with the lower frame and fixed with a prestressed extension 6.1.1, and the framed solar panel 8 rests on the upper horizontal part 6.3 of the frame from below. For each framed solar panel 8, at least two extension-row mounting brackets are provided (the number of brackets depends on the slope of the roof, the higher the slope of the roof, the greater the number of brackets required). When two extension rows mounting brackets 6 are used, they are attached in the immediate vicinity of the ends of the separately framed solar panel 8 (e.g., approx. 20 cm from the end of the solar panel).

When additional brackets are used, they are placed approximately centrally on the framed solar panel 8 between the extreme clamps.

The mounting bracket 6 of the extension row is made of stainless steel with small shape memory. This feature is particularly important at the prestressed lower horizontal part 6.4 and the extensions 6.1.1 and 6.4.1, which allows the insertion of the framed solar panel 8 and the batten 9 connected to the slats to retain their original shape.

Figure 7:
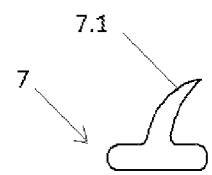
FIG. 7 shows the water seal of the upper strip, including the extended upper strip.

The lower part of the water seal 7 (FIG. 7) to be installed in the upper strip 1 is in the shape of the sealing groove 1.1.1 of the upper strip and part 7.1 projecting from the sealing groove is of a special shape (with a tapered top).

The water trap is an integral part of the invention. Building materials (such as roof tiles), which have the function of directing the movement of rainwater and snow away from the building structures (roof or façade), are made on the principle that there are channels with partitions between the two elements that prevent water from moving under the stones. On the same principle, a two-channel water trap is created by the interaction of the left-side strip 2 and the right-side strip 3 and optionally also by the interaction of the left-side strip 2 and the right-side strip 3 and the side strip extension strip 4 installed between them. A water trap is formed when the framed solar panel 8 in the adjacent column, provided with a right-side strip 3, is placed on the left-side strip 2. In this way, the right-side strip 3 is placed inside the left-side strip 2, and a two-channel water trap is formed. A similar two-channel water trap is also formed on the side strips by connecting the U-shaped ends of the side strip extension strip 4 mounted between them to the corresponding U-shaped part of the side strip. The two-channel and double-walled strip solution prevent water from entering the water trap horizontally in case of heavy rainfall.

Figure 11:
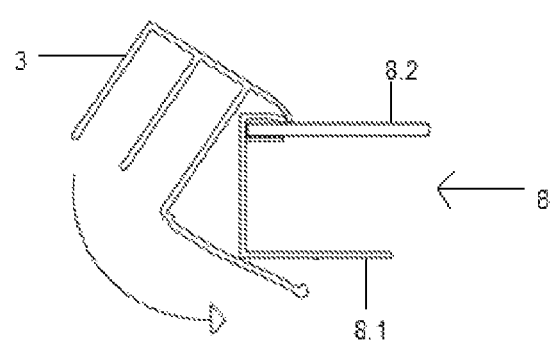
FIG. 11 shows the principle of click-on connection of the side strip to the framed solar panel according to the invention (by way of example of the right-side strip).

The strips 1 (or 1A or 1B), 2, 3 are intended to be connected to the framed solar panel 8 as a click-on connection (see FIG. 11), which allows the strips to be attached to the solar panel frame 8.1 without the use of additional fastening devices and, if necessary, easily removed from them without the use of aids and in addition, such a technical solution makes the installation of the framed solar panel 8 on the substrate building integrally weatherproof. In addition, extended strips and extension strips are optionally used in situations where the framed solar panels 8 do not provide complete coverage of the substrate, by which the modular surface formed of the framed solar panels can be extended in both height and width, if necessary, in order to increase the effective coverage of the modular surface of the framed solar panels 8, depending on the dimensions of the substrate.

The framed solar panels 8 connected to the strips are also intended to be attached to the brackets 5, 6 in a click-on connection, which allows these solar panels to be attached to the mounting brackets without the use of additional fastening means and, if necessary, removed without the aids.

Since the cutting angles of each strip 1 (or 1A or 1B), 2, 3 profile have a strip-specific cut and configuration that mates with the cutting angle of the adjacent strip, this necessitates following the order of joining the strips. However, the order of joining the strips does not depend on whether the framed solar panels 8 are mounted on the (base) surface in a horizontal or vertical arrangement.

The strips are connected to the framed solar panel with 8 click-on connections in a specific order.

First, the left-hand side strip 2 is connected to the framed solar panel 8, for connecting of which it is placed at an angle of approximately 45° against the frame 8.1 of the solar panel, observing that the upper prestressed extension 2.4.1 of the profile of the left-side strip 2 with the arcuate part 2.4.2 and the engaging tip 2.4.3 extends to the surface of the framed solar panel glass 8.2, with the engaging tip 2.4.3 being hooked to the frame 8.1 at the solar panel glass 8.2. It is then checked whether the left-hand side strip 2 extends to the end of the solar panel frame 8.1 with the fastening end 2.1.3 of the bottom 2.1 prestressed extension 2.1.1. If this is the case, the left-side strip 2 can be pressurized and bent into place on the solar panel frame 8.1 until it clicks. This indicates that the mounting tip 2.1.3 of the profile of the left-hand side strip 2 is locked in the correct position on the solar panel frame 8.1. In summary, the framed solar panel 8 is connected to the left branch of the left-side strip 2 between prestressed extensions 2.4.1 and 2.1.1, and the left-side strip 2 is fixed to the frame of the solar panel 8.1. with the engaging tip 2.4.3 and the connection tip 2.1.3 as a click-on connection.

Next, an upper strip 1 is added to the framed solar panel 8, to the water sealing groove 1.1.1 of which an elastomeric water seal 7 has already been added. Following the diagonal sections at the ends of the profile of the right-side strip 1, the upper profile is placed at an angle of approximately 45° against the solar panel frame, and it is made sure that it fits into the profile corner of the pre-connected left-side strip 2 so that there is no more than one millimeter of space between them. It is observed that the upper arcuate prestressed extension 1.1.2 of the profile of the right-side strip 1 with the arcuate part 1.1.3 and the engaging tip 1.1.4 extends to the surface of the glass 8.2 of the framed solar panel, whereas the engaging tip 1.1.4 is hooked to frame 8.1 at the glass 8.2 of the solar panel. It is then checked whether the connected upper strip 1 extends to the end of frame 8.1 of the solar panel by means of the fastening tip 1.3.3 of the prestressed extension 1.3.1 of the left-hand branch 1.3. If this is the case, the upper strip 1 can be pressurized, and it can be bent into place on frame 8.1 of the solar panel until it clicks. This indicates that the mounting tip 1.3.3 of the upper strip 1 is locked in the correct position on the solar panel frame 8.1.

Optionally, if the modular surface formed by the framed solar panels 8 needs to be extended in height according to the dimensions of the substrate, the upper extended strip 1A with intermediate branches or the extended upper strip 1B with intermediate branches can be used instead of the upper strip 1.

In summary, the framed solar panel 8 is connected to the left branch of the upper strip 1 or 1A or 1B between prestressed extensions 1.1.2 and 1.3.1, and the upper strip 1 or 1A or 1B is fixed to the solar panel frame by an engaging tip 1.1.4 and a mounting end 1.3.3 as a click-on connection.

Next, a right-hand side strip 3 is added to the framed solar panel 8. Following the diagonal sections at the ends of the profile of the right-side strip 3, the upper profile is placed at an angle of approximately 45° against the solar panel frame 8.1, and it is made sure that there is less than one-millimeter space in the corner aggregate of the pre-connected upper strip 1 (or 1A or 1B) and the right-side strip 3. It is observed that the upper arcuate prestressed extension 3.1.2 of the profile of the right-side strip 3 with the arcuate part 3.1.2 and the engaging tip 3.1.3 extends to the surface of the glass 8.2 of the framed solar panel 8, the engaging tip 3.1.3 engaging itself to the frame at the glass part of the solar panel. It is then checked whether the right-hand side strip 3 extends to the end of the frame 8.1 of the solar panel with the fastening tip 3.4.3 of the prestressed extension 3.4.1 of the branch 3.4. If this is the case, the right-side strip 3 can be pressurized and bent into place on the solar panel frame 8.1 until it clicks. This indicates that the mounting tip 3.4.3 of the right-hand side strip 3 is locked in the correct position on the solar panel frame 8.1. In summary, the framed solar panel 8 is connected to the right branch of the right-side strip 3 between prestressed extensions 3.1.1 and 3.4.1, and the right-side strip 3 is fixed to the frame of the solar panel 8.1 with the engaging tip 3.1.3 and the connection stop 3.4.3 as a click-on connection.

The use of framed solar panel connectors and fasteners to make a weatherproof building integrated modular surface from framed solar panels comprises the following steps (see also FIGS. 9 and 10A-C):

Stage 1—preliminary activities (in the factory or on the site, before installing the solar panels on the substrate)
  the left-side panel 2 is first added to the framed solar panel 8;
  next, an upper strip 1 or an upper extended strip 1A with an intermediate branch or an extended upper strip 1B with intermediate branches is added to the framed solar panel 8 with a water seal 7;
  then the right-side strip 3 is added to the framed solar panel 8;

Stage 2—installation on a substrate (e.g., roof)
  in order to manufacture a modular surface, a control measurement of the section is performed on the substrate;
  the fastening brackets 5 of the first row are attached to the first row of the batten 9;
  the continuation row fastening brackets 6 are attached vertically to the next batten 9;
  the framed solar panel 8, previously surrounded by three strips, is first mounted vertically in the socket of the first row of mounting brackets 5, the correct alignment of the solar panel in the column is checked, and then the framed solar panel 8 is bent vertically against the next batten 9, which ensures that the frame 8.1 of the lower edge of the solar panel is correctly in the slot of the first row of mounting brackets 5 and that the base part of the framed solar panel 8 on the substrate of the lower part remains supported on the first row of mounting brackets 5;
  then the installation of the framed solar panels 8 connected with strips is continued in the column according to the previous step, with the difference that the framed solar panel 8 of each new vertical row rests on the fastening brackets 6 of the extension row at the bottom, wherein the overlap of the vertically mounted framed solar panels 8 must be such that the water seal 7 in the upper recess of the profile of the upper strip 1 or the extended strip 1A with an intermediate branch upper strip or tor the extended strip 1B with intermediate branches upper strip is hidden under the edge of the overlapping framed solar panel 8;
  when the column is filled with framed solar panels 8 up to the ridge, the installation of the next column continues, wherein it is important to ensure that the left-side panel 2 of the framed solar panel 8 of the first/previous column and the right-side panel 3 of the framed solar panel 8 of the second/next column engage with each other in U-shaped profiles so as to form a water trap through which water can drain from the substrate;
  optionally, a side strip extension strip 4 is added, the U-shaped ends of which engage with the U-shaped profiles of the left-side strip 2 and the right-side strip 3 so as to form a water trap;
  optionally, the side rail extension strip 4 is cut shorter by removing one U-shaped end therefrom;
  the outermost side strip or side strip extension strip 4 is covered with a base plate edge plate.

As a result, the required number of framed solar panels 8 are mounted on the substrate and surrounded by strips and optionally extended strips and/or extension strips, which form a weatherproof and building-integrated modular surface that can be adapted to the dimensions of the substrate.

Depending on the subdivision of the substrate, the outer side strip of the outermost framed solar strip of the substrate can also be omitted. In this case, the frame of the solar panel is covered with an edge plate. The edge plates of the substrate can also be made as required and, when installed on the substrate, the various parts of the framed solar panel and its strips can be covered if necessary. These alternative endplate solutions (start and end solutions) can be different.

MARKING LIST

1—upper strip
1A—upper strip with an extended intermediate branch
1B—upper strip with an extended intermediate branch
1.1—base of strip 1
1.1.*a*—the base part of the strip 1A and 1B with extension
1.1.*b*—the base part of the strip 1B and 1B with an additional extension
1.1.1—sealing groove for water seal 7
1.1.2—left extension of the base 1.1
1.1.3—arcuate end part of left extension 1.1.2
1.1.4—engaging tip of the arcuate end part 1.1.3
1.2—right branch of the strip 1
1.2.1—sole plate of the branch 1.2 platform on the strip 1B
1.3—left branch of strip 1
1.3.1—prestressed extension of the left branch 1.3
1.3.2—wavy connection of the left arm 1.3 and the extension 1.3.1
1.3.3—fastening tip for the end of extension 1.3.1

1.4 and 1.5—intermediate branches of strip 1B
1.4.1—sole plate of the branch 1.4 on the strip 1B
1.5.1—sole plate of the branch 1.5 platform on the strip 1B
2—left-side strip
2.1—base of the left-side strip 2
2.1.1—prestressed extension of the base 2.1
2.1.2—wavy connection part at the transition point of base 2.1 and extension 2.1.1
2.1.3—fastening tip for the end of extension 2.1.1
2.2, 2.3, 2.4—branches of the leftside strip 2
2.4.1—prestressed extension of the branch 2.4
2.4.2—arcuate end part of left extension 2.4.1
2.4.3—engaging tip of the arcuate end part 2.4.2
3—right-side strip
3.1—base of the left-side strip 3
3.1.1—prestressed extension of the base 3.1
3.1.2—arcuate end part of extension 3.1.1
3.1.3—engaging tip of the arcuate end part 3.1.2
3.2, 3.3, 3.4—branches of the left-side strip 3
3.4.1—prestressed extension of the branch 3.4
3.4.2—wavy connection part at the transition point of base 3.4 and extension 3.4.1
3.4.3—fastening tip for the end of extension 3.4.1
4—side strip extension strip
4.1—base of the side strip extension strip 4
4.1.1—part 4.1 of the base
4.1.2—part 4.1 of the base
4.2, 4.3, 4.4—branches projecting from the base part 4.1.1
4.5, 4.6, 4.7—branches projecting from the base part 4.1.2
4.8—straight branch of the base 4.1
4.8.1—branch 4.8 sole plate
5—first-row mounting bracket
5.1—upper vertical part of the first-row mounting bracket 5
5.1.1—prestressed extension of the upper vertical part 5.1
5.2—upper vertical part of the first-row mounting bracket 5
5.3—upper vertical part of the first-row mounting bracket 5
5.3.1—prestressed extension of the lower vertical part 5.3
5.4—upper vertical part of the first-row mounting bracket 5
5.5—upper vertical part of the first-row mounting bracket 5
5.5.1, 5.5.2—openings in the lower horizontal part 5.5
6—continuing row mounting bracket
6.1—upper vertical part of the continuing row mounting bracket 6
6.1.1—prestressed extension of the upper vertical part 6.1
6.2—lower vertical part of the continuing row mounting bracket 6
6.3—upper horizontal part of the first-row mounting bracket 6
6.4—upper horizontal part of the first-row mounting bracket 6
6.4.1—prestressed extension of the lower horizontal part 6.4
6.4.2—openings in the lower horizontal part 6.4
6.5—reinforcement part of the upper horizontal part 6.3, the lower horizontal part 6.4 and the lower vertical part 6.2
7—water seal
7.1—protruding part of the water seal 7
8—framed solar panel
8.1—solar panel frame
8.2—solar panel glass
9—batten

The invention claimed is:
1. A system for connecting and fixing framed solar panels to make a weatherproof, building-integrated modular on substrate batten, the system comprises:
connecting means comprising: an upper strip having a U-profile,
a left-side strip and a right-side strip, the left-and right-side strips being configured to engage an adjacent side strip and partially prestressed mounting brackets and a water seal, wherein
the upper strip (1) comprises:
an upper strip base (1.1) and a straight right branch (1.2) forming a right angle to the upper base strip (1.1), and a straight left branch (1.3), such that a U-gap is formed in between the left and the right branches; and a sealing groove (1.1.1) in middle of the upper strip base (1.1);
wherein the upper strip base (1.1) further comprises an upper strip base extension (1.1.2) projecting to the left and being prestressed towards the straight left branch (1.3)), thus forming a slightly arcuate end part (1.1.3) which comprises an engaging tip (1.1.4);
the straight left branch (1.3) comprises a straight left branch extension (1.3.1) which is arcuately prestressed towards the straight left branch (1.3) and projecting from the straight left side branch (1.3) substantially in a right angle to the left; and wherein the straight left branch extension (1.3.1) comprises a wavy connecting part (1.3.2) at a connecting point of the straight left branch (1.3) and the straight left branch extension (1.3.1), and a fastening tip (1.3.3) at the end of the straight left branch extension (1.3.1);
the left-side strip (2) comprises:
a left-side strip base (2.1) and a first, a second and a third straight branches (2.2), (2.3), (2.4) projecting in right angles away from the left-side strip base (2.1), forming two U-shaped gaps opening upwards away from the left-side strip base (2.1);
an upper part of the third branch (2.4) has a left-side strip extension (2.4.1) projecting to the left in a right angle against the third branch (2.4) and is prestressed towards the third branch (2.4), and an arcuate end part (2.4.2) comprising a coupling tip (2.4.3);
wherein the left-side strip base (2.1) comprises a left-side strip base extension (2.1.1) projecting to the left and is arcuately prestressed towards the third branch (2.4), and the left-side strip base (2.1) further comprises a wavy connecting part (2.1.2) at a transition point between the left-side strip base (2.1) and the left-side strip extension (2.1.1), and a fastening tip (2.1.3);
the right-side strip (3) comprises:
a right-side strip base (3.1) and a first, a second and a third straight branches (3.2), (3.3), (3.4) projecting in right angles away from the right-side strip base, forming two U-shaped gaps opening downwards away from the right-side strip base (3.1);
wherein the right-side strip base (3.1) comprises a right-side strip base extension (3.1.1) projecting to the right and being arcuately prestressed towards the straight branch (3.4), and the arcuate end part (3.1.2) comprises a coupling tip (3.1.3); and
wherein the third-branch (3.4) comprises a right- side strip extension (3.4.1) which is prestressed towards the third straight branch (3.4), and the third branch (3.4) is rotated substantially at a right angles arcuately to the right;
wherein the right-side strip extension (3.4.1) comprises a wavy connecting part (3.4.2) at the connecting point of the third branch (3.4) and the right-side strip extension (3.4.1), and a fastening tip (3.4.3) at the end of the right-side strip extension (3.4.1);
one or more first-row mounting brackets (5) comprising:
a stepped main part comprising a straight upper vertical part (5.1), a middle vertical part (5.2 a lower vertical part (5.3), an upper horizontal part (5.4) and a lower horizontal part (5.5), wherein the vertical and horizontal parts are arranged at right angles to each other;
and wherein in the upper vertical part (5.1), a wavy inward prestressed extension (5.1.1) is turned substantially in a right angles to left and is bent upwards in an obtuse angle from approximately at a center; and in the lower vertical part (5.3), a wavy inward biased prestressed extension (5.3.1) is turned substantially to the right in a right angles and is bent downwards from approximately at a-center at in an obtuse angle;
the lower horizontal part (5.5) has openings (5.5.1, 5.5.2) for the addition of optional fastening elements, the opening (5.5.1) configured to allow further positioning and fastening of the first-row fastening bracket (5);
one or more continuing row mounting brackets (6) comprising:
an upper horizontal part (6.3), and a lower horizontal part (6.4), connected by a lower vertical part (6.2, and forming a U-gap; wherein the upper vertical part (6.1) is projecting in a right angle upwards from the upper horizontal part (6.3);
and wherein the upper vertical part (6.1) has a wavy prestressed extension (6.1.1) turned back to the left in a substantially right angle, and bent upwards in an obtuse angle approximately at a center;
and wherein the connection between the upper horizontal part (6.3) and the lower vertical part (6.2) is in a right angles;
and wherein the lower horizontal part (6.4) is rotated substantially in a right angles to the right from a connection point to the lower vertical part (6.2), and wherein the lower horizontal part (6.4) has a stepped prestressed extension (6.4.1) towards the lower vertical part (6.2), an end of the stepped prestressed extension is bent outwards; and wherein the lower horizontal part (6.4) has an opening (6.4.2);
and wherein the upper horizontal part (6.3), the lower horizontal part (6.4) and the lower vertical part (6.2) are connected to a reinforcing part (6.5) following their shape;
in which system the upper strip (1), the left-side strip (2), and the right-side strip (3) are configured to be connected to a framed solar panel (8) by click-on installation; the first row mounting brackets (5) are configured to be connected by click-on installation on a solar panel frame (8.1) for attaching on a batten (9); the continuing row mounting brackets (6) are configured to connect an upper strip attached to a frame of one solar panel frame to an adjacent solar panel frame; and wherein the left-side strip and the right-side strip connected to the framed solar panel are further configured to be connected by a click-on connection to each other; and
wherein the strips and mounting brackets are made of metal; and
the water seal (7) is configured to be mounted on an outer side of the upper strip (1).

2. The system, according to claim 1, wherein the system further comprises a side strip extension strip (4) configured to provide extension to width of the left-side strip (2) and the right-side strip (3), wherein the side extension strip comprises:
a straight base (4.1) divided in middle into two base parts (4.1.1), (4.1.2), and a straight intermediate branch (4.8) extending in right angle at a transition point of the two base parts and the intermediate branch containing a sole plate (4.8.1) in its outer part;
straight branches (4.2), (4.3), (4.4) projecting away from the base part (4.1.1) right angles, thereby forming two U-shaped gaps opening-downwards away from the straight base (4.1);
straight branches (4.5), (4.6), and (4.7) projecting from the base part (4.1.2) in right angles toward the base part, thereby forming two U-shaped gaps opening upwards away the straight base (4.1).

3. The system according to claim 1, wherein the upper strip is an elongated strip (1A having at least one intermediate branch (1.4.1) and the upper strip base (1.1) having an extended base part (1.1.a).

4. The system according to claim 1, wherein the upper strip is an elongated strip (1B) having two intermediate branches (1.4.1, 1.5.1) and the upper strip base (1.1) has two extended base parts (1.1a and 1.1b).

5. System according to claim 1, wherein a lower part of the water seal (7) has a shape of a sealing groove (1.1.1) and a part (7.1) projecting from the sealing groove has a tapered point at the top.

6. A method for connecting and fixing framed solar panels to make a weatherproof building-integrated modular surface using the system according to claim 1, wherein the method comprises the steps of:
connecting the upper strip (1) and the left and right side strips (2 and 3) to a framed solar panel (8) in a fixed sequence with a click-on connection in a following order:
first the left-hand side strip (2) is connected to the framed solar panel (8), and is placed at an angle of approximately 45° against the solar panel frame (8.1); securing that the upper prestressed extension (2.4.1) of the left-hand side strip (2) with the arcuate part (2.4.2) and the coupling tip (2.4.3) is installed on a surface of the glass (8.2) of the framed solar panel (8), wherein the coupling tip (2.4.3) is connected to the frame (8.1); securing that the prestressed extension (2.1.1) of the left-hand side strip (2) at the left hand side strip base (2.1) extends to-end of the solar panel frame (8.1); applying pressure to the left-hand side strip (2), and bending the strip into place on the solar panel frame (8.1) until it clicks;
next the upper strip (1) is connected to the framed solar panel (8) with a water seal (7), and is placed at an angle of approximately 45° against the solar panel frame (8.1); securing that the solar panel frame fits into the corner of the profile of the left side strip (2) already connected so that there is no more than 1 mm of space between them; checking that the prestressed extension (1.1.2), the arcuate part (1.1.2) and the engaging tip (1.1.4) of the upper strip reaches the surface of the glass (8.2); checking that the fastening tip (1.3.3) of the prestressed extension (1.3.1) of the left branch (1.3) of the upper strip (1) reaches the end of the frame (8.1); applying pressure to the upper strip (1) and bending the strip bent into place on the solar panel frame (8.1) until it clicks;

thereafter connecting the right-side strip (3) to the framed solar panel (8), placed at an angle of approximately 45° to the frame of the solar panel (8.1); securing that the frame of the solar panel fits into the corner of the profile of the already connected right-hand side strip (3) so that there is no more than 1 mm of space between them; checking that the arcuate end tip (3.1.2) of the prestressed extension (3.1.1) of the base (3.1) of the right-side strip and the engaging tip (3.1.3) reach the surface of the glass (8.2); checking that the prestressed extension (3.4.1) of the right-side strip (3), the branch (3.4) and the attachment nozzle (3.4.3) reach the end of the frame (8.1); applying pressure to the right-side strip (3), and bending the strip into place on the solar panel frame (8.1) until it clicks;

fastening on a first row of the batten (9) the first-row fastening brackets (5) with the lower vertical part (5.3) and the prestressed extension (5.3.1) and optionally fastening the brackets (5) to the batten (9) through the openings (5.5.1), (5.5.2) in the horizontal part (5.5);

mounting the framed solar panel (8) connected to the upper strip, right side strip and left side strip strips (1 and 2 and 3) on a substrate to rest vertically on the mounting brackets (5) of the first row attached to a groove (9), and pushing against the upper vertical part (5.1) of the first row mounting brackets (5) by the lower frame (8.1) of the solar panel and fixing as a click-on connection by a prestressed extension (5.1.1); supporting the framed solar panel (8) from below on the upper horizontal part (5.4) of the first row mounting brackets (5); bending the framed solar panel (8) vertically against a next batten (9) ensuring that the frame (8.1) of the lower edge of the solar panel is correctly in the first row mounting brackets (5) and that the framed solar panel (8) rests on the first row mounting brackets (5) at the substrate;

attaching the extension row mounting brackets (6) vertically behind a next batten, and fastening the brackets around the roof batten (9) through the lower horizontal part (6.4), and the stepped prestressed extension (6.4.1) and the lower vertical part (6.2), and optionally fastening the brackets (6) to the batten (9) in the lower horizontal part (6.4) through the opening (6.4.2) with additional fastening means;

fastening two framed solar panels (8) connected with upper strip (1) and installed vertically in a row on top of each other to the extension row mounting bracket (6);

mounting the vertically bottom framed solar panel (8) on the roof batten (9) with the upper part so that the U-gap of the upper strip (1) rests on the roof batten (9) and the extension row mounting bracket (6) is attached with a U-gap vertically to the upper strip (1) of the lower framed solar panel (8) in such a way that the inside of the upper horizontal plane (6.3) of the extension row mounting bracket (6) is supported against it, whereby the batten (9) and vertically the upper part of the lower framed solar panel (8) are fixed in the U-gap of the extension row mounting bracket (6) with the help of the prestressed horizontal part (6.4);

the vertically upper framed solar panel (8) is pushed against the upper vertical part (6.1) of the extension row connection bracket (6) with the lower frame and fixed with a prestressed extension (6.1.1) as a click-on connection, and the framed solar panel (8) is rested on the upper horizontal part (6.3) of the extension row connection bracket (6);

continuing installation of the framed solar panels (8) connected with the strips (1 or 2 and 3) vertically in a column in such a way that the framed solar panel (8) of each new vertical row rests on the extension row fastening brackets (6) at the bottom, wherein the overlap of the vertically mounted framed solar panels (8) is such that the water seal (7) of the upper strip (1) is hidden under the edge of the overlapping framed solar panel (8);

continuing installation of framed solar panels to a next column upon installation of the framed solar panels onto a first column, wherein it is ensured that the left-side strip (2) of the framed solar panel (8) of the first/previous column and the right-side panel (3) of the framed solar panel (8) of the second/next column engage with each other in U-shaped profiles so as to form a water trap;

optionally, the side strip extension strip (4) is added, the U-shaped ends of which engage with the U-shaped profiles of the left-side strip (2) and the right-side strip (3) so as to form a water trap;

optionally, the side strip extension strip (4) is cut shorter by removing one U-shaped end therefrom;

covering the outermost side strip or side strip extension strip (4) with a base plate edge plate.

7. The method of claim 6, wherein the upper strip is an elongated upper strip (1A) having at least one intermediate branch (1.4.1) and the upper strip base (1.1) having an extended base part (1.1.a).

8. The method of claim 6, wherein the upper strip is an elongated strip (1B) having two intermediate branches (1.4.1, 1.5.1) and the upper strip base (1.1) has two extended base parts (1.1a and 1.1b).

* * * * *